United States Patent
Comber et al.

(10) Patent No.: US 12,502,344 B2
(45) Date of Patent: Dec. 23, 2025

(54) DEODORANTS COMPRISING ALKYLAMIDO AND ALKENYLAMIDO-MORPHOLINIUM COMPOSITIONS

(71) Applicant: Colonial Chemical, Inc., South Pittsburg, TN (US)

(72) Inventors: Robert N. Comber, South Pittsburg, TN (US); Robert J. Coots, South Pittsburg, TN (US); Dennis Abbeduto, South Pittsburg, TN (US); Jordan Taylor, South Pittsburg, TN (US); Lucas R. Moore, South Pittsburg, TN (US)

(73) Assignee: Colonial Chemical, Inc., South Pittsburg, TN (US)

( * ) Notice: Subject to any disclaimer, the term of this patent is extended or adjusted under 35 U.S.C. 154(b) by 326 days.

(21) Appl. No.: 18/273,968

(22) PCT Filed: Jan. 24, 2022

(86) PCT No.: PCT/US2022/013540
§ 371 (c)(1),
(2) Date: Jul. 24, 2023

(87) PCT Pub. No.: WO2022/159823
PCT Pub. Date: Jul. 28, 2022

(65) Prior Publication Data
US 2024/0238181 A1  Jul. 18, 2024

Related U.S. Application Data

(60) Provisional application No. 63/140,759, filed on Jan. 22, 2021.

(51) Int. Cl.
| | | |
|---|---|---|
| *A61K 8/27* | (2006.01) | |
| *A61K 8/31* | (2006.01) | |
| *A61K 8/33* | (2006.01) | |
| *A61K 8/34* | (2006.01) | |
| *A61K 8/49* | (2006.01) | |
| *A61Q 15/00* | (2006.01) | |

(52) U.S. Cl.
CPC ........... *A61K 8/4926* (2013.01); *A61Q 15/00* (2013.01)

(58) Field of Classification Search
None
See application file for complete search history.

(56) References Cited

U.S. PATENT DOCUMENTS

| | | | | |
|---|---|---|---|---|
| 4,851,214 A | * | 7/1989 | Walters | A61K 8/49 424/47 |
| 2004/0052748 A1 | | 3/2004 | Vondruska | |
| 2006/0057194 A1 | | 3/2006 | Gao | |

FOREIGN PATENT DOCUMENTS

WO  WO 93/11758 A1  6/1993

OTHER PUBLICATIONS

Bährle-Rapp Marina: "Isostearamidopropyl Ethylmorpholinium Ethosulfate" In: "Springer Lexikon Kosmetik und Körperpflege", Jan. 1, 2007 (Jan. 1, 2007), Springer, Berlin, Heidelberg, XP093242175, ISBN: 978-3-540-71095-0 pp. 277-290.
Mintel; 15 Oct. 13, 2016 (Oct. 13, 2016), anonymous: "Cool Ocean Wave 3 in 1 Shampoo, Conditioner and Body Wash", XP093242135, Database accession No. 4344573.
Supplementary European Search Report issued Feb. 10, 2025 in corresponding European application No. 22743331.5.
PubChem-SID-376089175, Modify Date: Nov. 5, 2019 (Nov. 5, 2019).
Hwang et al. "Cationic additives in nanosystems activate cytotoxicity and inflammatory response of human neutrophils: lipid nanoparticles versus polymeric nanoparticles", International Journal of Nanomedicine. 2015. 10, pp. 371-385.

\* cited by examiner

*Primary Examiner* — Brian Gulledge
(74) *Attorney, Agent, or Firm* — Stites & Harbison PLLC; Richard S. Myers, Jr.

(57) ABSTRACT

Personal malodors due to the chemical or bacterial action occurring on the skin or hair are inhibited by applying formulations containing Soyamidopropyl Ethylmorpholinium Ethosulfate.

26 Claims, 1 Drawing Sheet

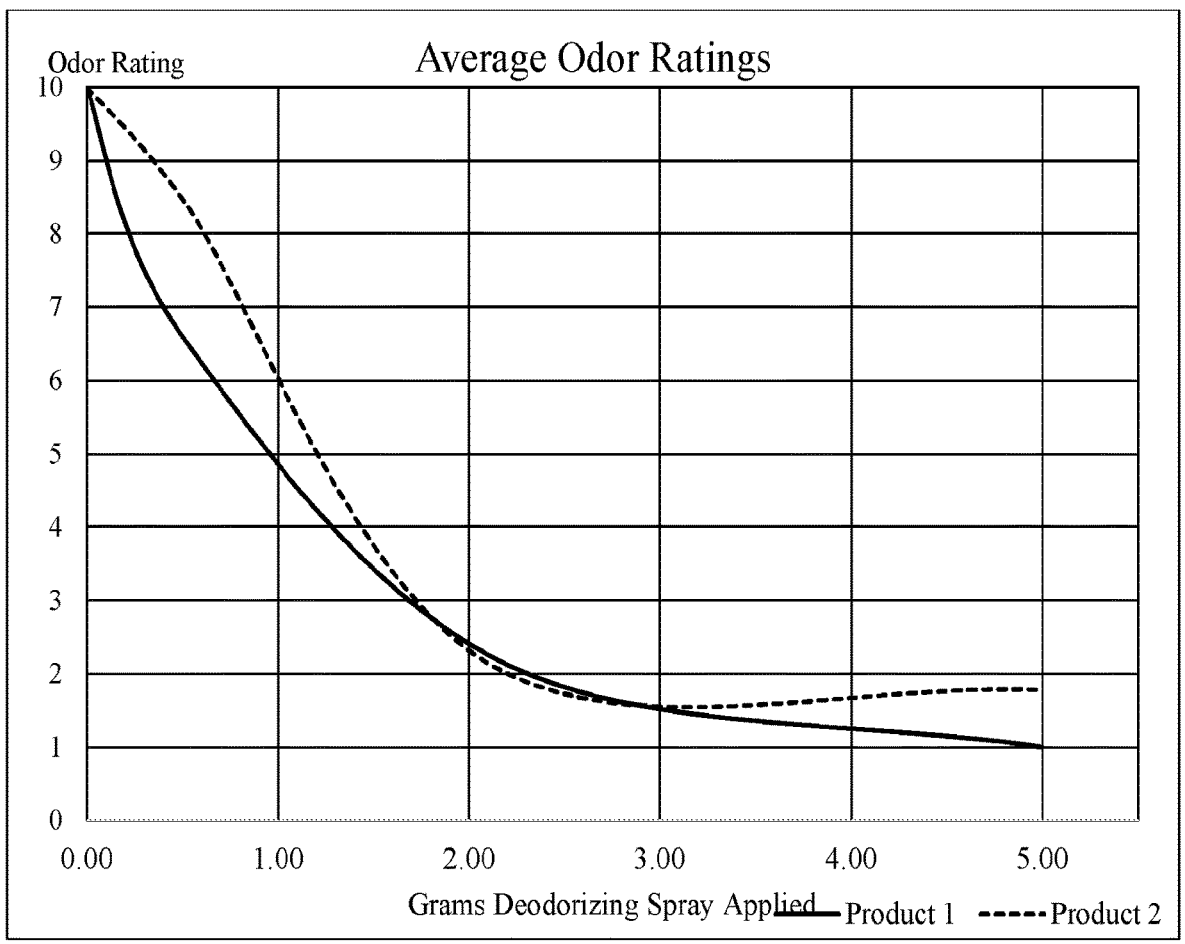

DEODORANTS COMPRISING ALKYLAMIDO AND ALKENYLAMIDO-MORPHOLINIUM COMPOSITIONS

This application claims priority from International Patent Application No. PCT/US2022/13540, filed Jan. 24, 2022, which claims benefit to U.S. Provisional Application No. 63/140,759 filed Jan. 22, 2021; the contents of which are incorporated herein by this reference.

FIELD OF THE INVENTION

This invention relates to deodorant or deodorizing compositions comprising an alkyl amido and alkenyl amidomorpholinium composition of the present invention. In embodiments of the present invention, the composition comprises a soyamidopropyl ethylmorpholinium ethosulfate. The compositions of the present invention are useful in controlling odor. For example purposes only, the compositions of the present invention are useful for human or animal body or hair deodorizing formulations, household deodorizing solutions, deodorizing powder, deodorizing gel, deodorizing spray, carpet deodorizer, room deodorizer, and other commonly marketed human, animal, or household deodorizing compositions.

BACKGROUND AND SUMMARY OF THE INVENTION

The present invention is directed to alkyl amido and alkenyl amido-morpholinium compositions that are useful in controlling odor and odor neutralization.

In one embodiment the composition is a Soyamidopropyl Ethylmorpholinium Ethosulfate composition made from high oleic soybean oil, high in oleamido-content. Other compositions comprise other saturated and unsaturated alkylamido-derivatives in the product including, for example, linoleamido-, that would have two double bonds compared to the one of Oleamidopropyl Ethylmorpholinium Ethosulfate.

One embodiment of the present invention is a malodor composition that comprises a compound of the following formula:

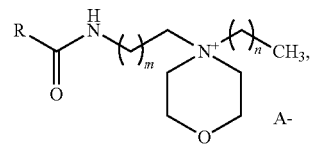

and a delivery system or carrier base;
wherein R is $C_8$-$C_{22}$ alkyl or $C_5$-$C_{22}$ alkenyl;
A- is a counterion;
and n is 0-4, and m is 1-3.

Another embodiment of the present invention is a composition that comprises a compound of the following formula:

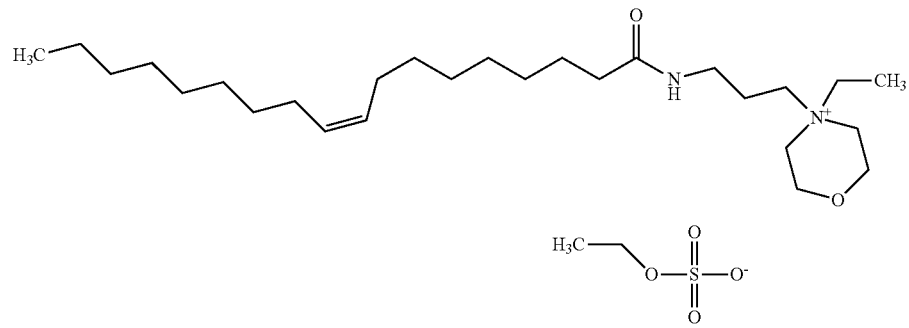

Oleamidopropyl Ethylmorpholinium Ethosulfate

There are many sources and types of malodors. It is known that body odor is primarily caused by the bacterial decomposition of lipids or proteinaceous matter secreted by the apocrine glands. Malodorous by-products such as low molecular weight fatty acids, mercaptans, amines, indoles, ammonia and hydrogen sulfide are produced.

Some cosmetic products like home permanents or depilatories generate malodors which are primarily ammonia and mercaptans.

Unpleasant odors associated with food or food processing include cabbage or onion odor. Odors like tobacco or mildew may be an undesirable aspect of indoor environments. Animals are another source of malodors.

Regardless of the source, malodors are generally low molecular weight organic molecules which are volatile. Compositions of the present invention function in part as a complexing agent for these molecules and reduces their vapor pressure. Ideally, an equimolar complex is formed between compositions of the present invention and the malodor.

Compositions of the present invention can be formulated into various product types, e.g., solid sticks, powders, creams, lotions and aerosols. Potential applications include solid underarm deodorants, antiperspirants or air fresheners, foot or body powders, animal care products, laundry detergents, hair care lotions and aerosol underarm deodorants or space deodorizers. In all cases, the active ingredient is a particular Soyamidopropyl Ethylmorpholinium Ethosulfate derived from high oleic soybean oil and aminopropylmorpholine. This invention is also directed to a method for deodorizing human skin and hair by placing formulations of the invention in intimate contact therewith.

U.S. Pat. No. 4,851,214, Deodorants containing N-Soya-N-Ethyl morpholinium Ethosulfate, assigned to ICI Americas, was directed to formulations containing N-soya-N-ethyl morpholinium ethosulfate (soyaethyl morpholinium ethosulfate) which are useful in controlling odor.

DESCRIPTION OF THE INVENTION

The compositions of the present invention relate to deodorant or deodorizing compositions that are particularly useful for application on a human or animal body or hair. A wide variety of compositions can be formulated with the compositions of the present invention, including deodorizing solution, deodorizing powder, deodorizing gel, deodorizing spray, deodorizing stick, deodorizing roll-on, deodorizing paste, deodorizing cream, deodorizing lotion, deodorizing aerosol; human or animal deodorizing dentifrice, or oral cavity deodorizing toothpaste, deodorizing mouthwash, deodorizing dental powder, deodorizing mouth spray, deodorizing dental gel, deodorizing lozenges; household deodorizing solution, deodorizing powder, deodorizing gel, deodorizing spray, carpet deodorizer, room deodorizer, and other commonly marketed human, animal, or household deodorizing compositions.

A resulting consumer product form can include shampoos, aftershaves, sunscreens, band lotions, skin creams, liquid soaps, bar soaps, bath oil bars, shaving creams, dishwashing liquids, conditioners, permanent waves, hair relaxers, hair bleaches, hair detangling lotion, styling gel, styling glazes, spray foams, styling creams, styling waxes, styling lotions, mousses, spray gels, pomades, shower gels, bubble baths, hair coloring preparations, temporary and permanent hair colors, color conditioners, hair lighteners, coloring and non-coloring hair rinses, hair tints, hair wave sets, permanent waves, curling, hair straighteners, hair grooming aids, hair tonics, hair dressings and oxidative products, spritzes, styling waxes and balms Additionally, the delivery system can be human body or hair deodorizing solution, deodorizing powder, deodorizing gel, deodorizing spray, deodorizing stick, deodorizing roll-on, deodorizing paste, deodorizing cream, deodorizing lotion, deodorizing aerosol, and other commonly marketed

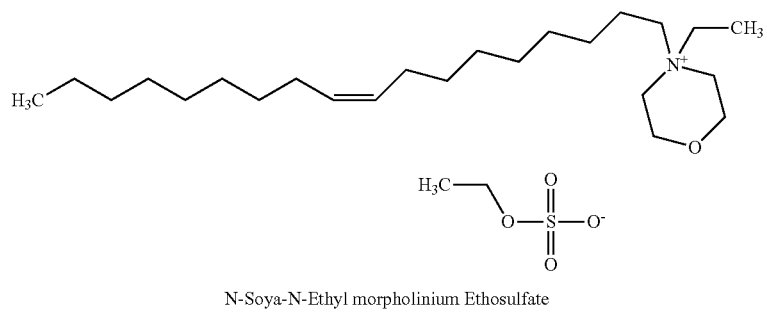

N-Soya-N-Ethyl morpholinium Ethosulfate

US Published Patent Application No. 2006/0045860, Zinc Zeolite Based Deodorants and Deodorizers, assigned to BIODERM RESEARCH, that describes zinc zeolite as providing strong deodorant and deodorizing benefits, even in the presence of water.

BRIEF DESCRIPTION OF THE DRAWINGS

FIG. 1 is a graph that shows average odor ratings of compositions of the present invention. Average odor ratings given to each jar containing acetic acid and some predetermined amount of sequestrant. Product 1 is Soyaethyl Morpholinium Ethosulfate. Product 2 is Soyamidopropyl Ethylmorpholinium Ethosulfate (Product 2) is an embodiment of the invention.

human body and hair deodorizing compositions, household deodorizing solution, deodorizing powder, deodorizing gel, deodorizing spray, carpet deodorizer, room deodorizer, and other commonly marketed household deodorizing compositions, animals and pets deodorizing solution, deodorizing powder, deodorizing gel, deodorizing spray, animals and pets carpet deodorizer, animals and pets room deodorizer, and other commonly marketed animal and pet deodorizing compositions.

In another preferred aspect, the delivery system can be traditional water and oil emulsions, suspensions, colloids, microemulsions, clear solutions, suspensions of nanoparticles, emulsions of nanoparticles, or anhydrous compositions.

As stated above, one embodiment of the present invention is a malodor composition that comprises a compound of the following formula:

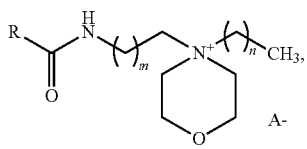

and a delivery system or carrier base;
wherein R is $C_8$-$C_{22}$ alkyl or $C_8$-$C_{22}$ alkenyl;
A- is a counterion;
and n is 0-4, and m is 1-3.

R may also be an alkyl derivative from high oleic soybean oil, olive oil, or soybean oil. R may also be other saturated and unsaturated alkyl derivatives such as, for example, linoleyl.

In another embodiment, the counterion (A-) is of the following formula:

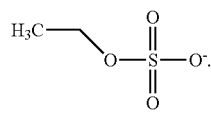

The delivery system or carrier base composition of the present invention may be aqueous or anhydrous.

The delivery system or carrier base can be selected in the form of a lotion, cream, gel, spray, thin liquid, body splash, powder, compressed powder, tooth paste, tooth powder, mouth spray, paste dentifrice, clear gel dentifrice, mask, serum, solid cosmetic stick, lip balm, shampoo, liquid soap, bar soap, bath oil, paste, salve, collodion, impregnated patch, impregnated strip, skin surface implant, impregnated or coated diaper, and similar delivery or packaging form.

The term The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, optionally substituted alkyl, cycloalkyl, alkoxy, amino, ether, halide, hydroxy, nitro, silyl, sulfo-oxo, or thiol, as described herein.

The term "alkenyl" as used herein is a hydrocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene is present, or it can be explicitly indicated by the bond symbol C=C. The alkene group can be branched or unbranched. The alkene group can also be substituted or unsubstituted.

The compositions of the present invention also have the same uses as those in U.S. Pat. No. 4,851,214. For example, the compositions of the present invention can be formulated in various additional cosmetic and pharmaceutical consumer products utilizing a variety of delivery systems and carrier bases, including those listed above.

Additionally, the compositions of the present invention can be formulated into a delivery system or a carrier base in the form of a lotion, cream, gel, spray, thin liquid, body splash, powder, compressed powder, tooth paste, tooth powder, mouth spray, paste dentifrice, clear gel dentifrice, mask, serum, solid cosmetic stick, lip balm, shampoo, liquid soap, bar soap, bath oil, paste, salve, collodion, impregnated patch, impregnated strip, skin surface implant, impregnated or coated diaper, and similar delivery or packaging form.

Additionally, the compositions of the present invention can be formulated into a delivery system for use as a human body or hair deodorizing solution, deodorizing powder, deodorizing gel, deodorizing spray, deodorizing stick, deodorizing roll-on, deodorizing paste, deodorizing cream, deodorizing lotion, deodorizing aerosol, and other commonly marketed human body and hair deodorizing compositions, household deodorizing solution, deodorizing powder, deodorizing gel, deodorizing spray, carpet deodorizer, room deodorizer, and other commonly marketed household deodorizing compositions, animals and pets deodorizing solution, deodorizing powder, deodorizing gel, deodorizing spray, animals and pets carpet deodorizer, animals and pets room deodorizer, and other commonly marketed animal and pet deodorizing compositions.

The delivery system can be traditional water and oil emulsions, suspensions, colloids, microemulsions, clear solutions, suspensions of nanoparticles, emulsions of nanoparticles, or anhydrous compositions.

Additional cosmetically or pharmaceutically beneficial ingredients can also be included in the formulated compositions of the present invention, which can be selected from, but not limited to skin cleansers, cationic, anionic surfactants, non-ionic surfactants, amphoteric surfactants, and zwitterionic surfactants, skin and hair conditioning agents, vitamins, hormones, minerals, plant extracts, anti-inflammatory agents, collagen and elastin synthesis boosters, UVA/UVB sunscreens, concentrates of plant extracts, emollients, moisturizers, skin protectants, humectants, silicones, skin soothing ingredients, antimicrobial agents, antifungal agents, treatment of skin infections and lesions, blood microcirculation improvement, skin redness reduction benefits, additional moisture absorbents, analgesics, skin penetration enhancers, solubilizers, moisturizers, emollients, anesthetics, colorants, perfumes, preservatives, seeds, broken seed nut shells, silica, clays, beads, luffa particles, polyethylene balls, mica, pH adjusters, processing aids, and combinations thereof.

The compositions of the present invention can comprise one or more excipient selected from the group consisting of water, saccharides, surface active agents, humectants, petrolatum, mineral oil, fatty alcohols, fatty ester emollients, waxes and silicone-containing waxes, silicone oil, silicone fluid, silicone surfactants, volatile hydrocarbon oils, quaternary nitrogen compounds, amine functionalized silicones, conditioning polymers, rheology modifiers, antioxidants, sunscreen active agents, di-long chain amines from about $C_{10}$ to $C_{22}$, long chain fatty amines from about $C_{10}$ to $C_{22}$, fatty alcohols, ethoxylated fatty alcohols and di-tail phospholipids.

The present inventors have discovered that amidoamines made by the amidation reaction between N-(3-aminopropyl) morpholine and unsaturated fatty acids, fatty acid derivatives or glycerides, followed by quaternization with, for example, diethylsulfate, produce products capable of neutralizing malodors. These molecules contain key structural elements of a known deodorant, N-soya-N-ethyl morpholinium ethosulfate, reported in U.S. Pat. No. 4,851,214. They all contain the morpholinium group as well as an unsaturated fatty group in the molecule. The reaction conditions to make Soyamidopropyl Ethylmorpholinium Ethosulfate, as well as one method to evaluate its deodorization properties, are reported below.

Other embodiments of the present invention include molecules made from other unsaturated fatty acids (e.g., oleic, linoleic, ricinoleic) and unsaturated fatty glyceride oils (e.g., soybean oil, olive oil, safflower oil) and aminopropyl morpholine, followed by quaternization, for use as compositions with similar deodorization properties.

The compositions of the present invention may include other additives such as surface-active agents. Surface active agents include surfactants, which typically provide detersive functionality to a formulation or act simply as wetting agents. Surface-active agents can generally be categorized as anionic surface-active agents, cationic surface-active agents, nonionic surface-active agents, amphoteric surface-active agents and zwitterionic surface-active agents, and dispersion polymers.

The compositions of the present invention can also include one or more antioxidants.

The compositions of the present invention can also include preservatives. Example of preservatives, which may be used include, but are not limited to 1,2-dibromo-2,4-dicyano butane (Methyldibromo Glutaronitrile, known as MERGUARD. Nalco Chemical Company, Naperville, Ill., USA), benzyl alcohol, imidazolidinyl urea, 1,3-bis (hydroxymethyl)-5,5-dimethyl-2,3-imidazolidinedione (e.g., DMDM Hydantoin, known as GLYDANT, Lonza, Fairlawn, N.J., USA.), methylchloroisothiazolinone and methylisothiazolinone (e.g., Kathon, Rohm & Haas Co., Philadelphia, Pa., USA), methyl paraben, propyl paraben, phenoxyethanol, and sodium benzoate, and mixtures thereof.

The compositions of the present invention can also be packaged as an aerosol, in which case it can be applied either in the form of an aerosol spray or in the form of an aerosol foam. As the propellant gas for these aerosols, it is possible to use, in particular, dimethyl ether, carbon dioxide, nitrogen, nitrous oxide, air and volatile hydrocarbons, such as butane, isobutane, and propane.

EXAMPLES AND EXPERIMENTAL RESULTS

Synthesis of Soyamidopropyl Ethylmorpholinium Ethosulfate.

High Oleic Soybean oil (HOSO) is reacted with aminopropyl morpholine (APM) in an amidation reaction. This reaction yields three equivalents of HOSO-APM amide for each equivalent of the triglyceride. One equivalent of glycerin is also produced as a byproduct and remains in the product. The reaction is followed by a decrease in the Alkali value (titration) and by a decrease in triglyceride ester functionality (FTIR). Once the specifications have been reached, the product is cooled and isolated. This intermediate product contains a tertiary amine (the morpholine group), which can be quaternized by reaction with the alkylating agent, Diethyl Sulfate (DES). This conversion can be done in the same vessel such that the HOSO-APM amide does not need to be isolated. This reaction is very efficient and requires only moderate heating and mixing. The Diethyl Sulfate is added slowly, taking care that any exotherm is controlled by cooling and rate of addition. The progress of the reaction is followed by a decrease in Alkali value (titration) until the specification is reached and has stabilized within a small range. Yields for both the amidation and the quaternization are greater than 90% for each step. Finally, Soyamidopropyl Ethylmorpholinium Ethosulfate is diluted with water to a final actives concentration of approximately 40% for testing. It should be noted that in one embodiment of this invention Soyamidopropyl Ethylmorpholinium Ethosulfate can be used without water dilution, in an anhydrous form, for inclusion in anhydrous products (e.g., an anhydrous aerosolized deodorizer).

Deodorization Evaluations. Forced Preference Tests.

In the deodorization studies, two substances were tested for their ability to deodorize malodor: 1) Soyaethyl Morpholinium Ethosulfate (U.S. Pat. No. 4,851,214); and 2) Soyamidopropyl Ethylmorpholinium Ethosulfate (from this invention). These two products are Products 1 and 2, respectively, in FIG. 1. Both materials contain a quaternized morpholinium functionality within the deodorant molecule. All test formulations were approximately 0.8% by weight of active deodorizer/sequestrant in water.

Both products were tested as follows: Approximately 50 milligrams of acetic acid were placed on cotton balls (approximately 0.63 g in weight). The cotton balls were placed in 32 oz plastic jars, one per jar, and the lids were screwed on. After equilibrating for 4 hours the cotton balls were sprayed with predetermined amounts (0.25 g, 0.5 g, 2.0 g and 5 g) of deodorizing spray formulations and placed back in closed containers where they equilibrated for 2 hrs. In forced-preference testing, ten panelists were asked to open each jar and rate each on a scale from 1 to 10 with 10 being the highest level of acetic acid detected. The results of those ratings appear in FIG. 1 where the ratings given for each test substance is graphed versus the weight in grams of deodorizing formulations that had been applied to each cotton ball. Every panelist successfully picked the untreated control with just acetic acid. As can be seen, all test substances, including the known, previously-patented and commercially available Soyaethyl Morpholinium Ethosulfate (Product 1), reduced the perceivable malodor in a concentration-dependent fashion. Soyamidopropyl Ethylmorpholinium Ethosulfate (Product 2) is a new, unique, cost-effective odor reducing agent derived, in one embodiment, from high oleic soybean oil. Both steps needed for its synthesis can be performed in the same vessel and it can be used in an anhydrous form or diluted with water for aqueous applications. Like Soyaethyl Morpholinium Ethosulfate, Soyamidopropyl Ethylmorpholinium Ethosulfate should be effective against a host of malodors. It contains some common features of Soyaethyl Morpholinium Ethosulfate, namely a morpholinium quat function and a fatty group with some unsaturation. The inventors are not aware of any structure-function studies that have been conducted to date to determine how to maximize the deodorizing properties of these types of sequestrants. See FIG. 1.

The invention thus being described, it would be obvious that the same can be varied in many ways. Such variations that would be obvious to one of ordinary skill in the art is to be considered as being part of this disclosure.

Unless otherwise indicated, all numbers expressing quantities of ingredients, properties such as reaction conditions, and so forth used in the Specification are to be understood as being modified in all instances by the term "about." Accordingly, unless indicated by the contrary, the numerical parameters set forth in the Specification and Claims are approximations that may vary depending upon the desired properties sought to be determined by the present invention.

Notwithstanding that the numerical ranges and parameters setting forth the broad scope of the invention are approximations, the numerical values set forth in the experimental sections or the example sections are reported as precisely as possible. Any numerical value, however, inherently contain certain errors necessarily resulting from the standard deviation found in their respective testing measurements.

All patents, published patent applications, and other publications references herein are incorporated by reference in their entirety.

We claim:

1. A composition that comprises a quaternary compound of the following formula:

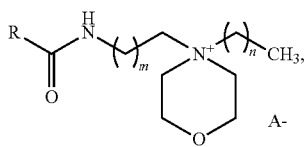

and a delivery system or carrier base;
wherein R is $C_8$-$C_{22}$ alkyl or $C_8$-$C_{22}$ alkenyl;
A- is a counterion;
and n is 0-4, and m is 1-3.

2. The composition of claim 1, wherein R is an alkene derived from high oleic soybean oil, olive oil, soybean oil, canola oil or safflower oil.

3. The composition of claim 1, wherein the counterion A is an ethosulfate counterion.

4. The composition of claim 3, wherein the counterion is of the following formula:

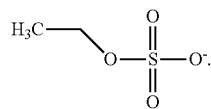

5. The composition of claim 1, wherein R is $C_{17}$ alkenyl.

6. The composition of claim 1, wherein the delivery system or carrier base composition of the present invention may be aqueous or anhydrous.

7. The composition of claim 1, wherein the delivery system or carrier base is in the form of a lotion, cream, gel, spray, thin liquid, body splash, powder, compressed powder, solid cosmetic stick, lip balm, shampoo, liquid soap, bar soap, bath oil, paste, or salve.

8. The composition of claim 1, wherein the delivery system is chosen from a water and oil emulsion, suspension, colloid, microemulsion, clear solution, suspension of nanoparticles, emulsion of nanoparticles, or anhydrous composition.

9. The composition of claim 1, wherein the delivery system is chosen from a deodorizing solution, deodorizing powder, deodorizing gel, deodorizing spray, deodorizing stick, deodorizing roll-on, deodorizing paste, deodorizing cream, deodorizing lotion, or deodorizing aerosol.

10. The composition of claim 1, wherein delivery system or carrier base can include additional ingredients or compositions selected from skin cleansers, cationic surfactants, anionic surfactants, non-ionic surfactants, amphoteric surfactants, and zwitterionic surfactants, skin and hair conditioning agents, vitamins, hormones, minerals, plant extracts, anti-inflammatory agents, whitening agents, deodorants, odor masking agents, antiperspirants, collagen and elastin synthesis boosters, UVA/UVB sunscreens, concentrates of plant extracts, emollients, moisturizers, skin protectants, humectants, silicones, skin soothing ingredients, antimicrobial agents, antifungal agents, treatment of skin infections and lesions, blood microcirculation improvement, skin redness reduction benefits, additional moisture absorbents, analgesics, skin penetration enhancers, solubilizers, moisturizers, emollients, anesthetics, colorants, perfumes, preservatives, seeds, broken seed nut shells, silica, clays, beads, luffa particles, polyethylene balls, mica, pH adjusters, processing aids, and combinations thereof.

11. A composition according to claim 1, wherein delivery system or a carrier base are selected in the form of a lotion, cream, gel, spray, thin liquid, body splash, powder, compressed powder, tooth paste, tooth powder, mouth spray, paste dentifrice, clear gel dentifrice, mask, serum, solid cosmetic stick, lip balm, shampoo, liquid soap, bar soap, bath oil, paste, salve, collodion, impregnated patch, impregnated strip, skin surface implant, impregnated or coated diaper, and similar delivery or packaging forms.

12. The compositions according to claim 7, wherein the delivery system can be traditional water and oil emulsions, suspensions, colloids, microemulsions, clear solutions, suspensions of nanoparticles, emulsions of nanoparticles, or anhydrous compositions.

13. The compositions according to claim 7, wherein the delivery system can be human body or hair deodorizing solution, deodorizing powder, deodorizing gel, deodorizing spray, deodorizing stick, deodorizing roll-on, deodorizing paste, deodorizing cream, deodorizing lotion, deodorizing aerosol, and other commonly marketed human body and hair deodorizing compositions.

14. The compositions according to claim 7, wherein the delivery system can be household deodorizing solution, deodorizing powder, deodorizing gel, deodorizing spray, carpet deodorizer, room deodorizer, and other commonly marketed household deodorizing compositions.

15. The compositions according to claim 7, wherein the delivery system can be animals and pets deodorizing solution, deodorizing powder, deodorizing gel, deodorizing spray, animals and pets carpet deodorizer, animals and pets room deodorizer, and other commonly marketed animal and pet deodorizing compositions.

16. The compositions according to claim 7, wherein the delivery system can be human or animal deodorizing dentifrice, or oral cavity deodorizing toothpaste, deodorizing mouthwash, deodorizing dental powder, deodorizing mouth spray, deodorizing dental gel, deodorizing lozenges, and other commonly marketed human or animal deodorizing dentifrice, or oral cavity deodorizing compositions.

17. A method for inhibiting malodors due to bacterial or chemical action occurring on skin or hair which comprises treating the area to be inhibited with a formulation comprising an odor reducing effective amount of a compound of the following formula:

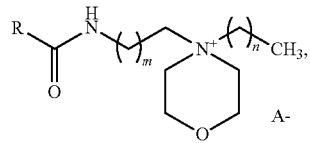

and a delivery system or carrier base;
wherein R is $C_8$-$C_{22}$ alkyl or $C_8$-$C_{22}$ alkenyl;
A- is a counterion;
and n is 0-4, and m is 1-3.

18. A method for inhibiting malodors due to bacterial or chemical action occurring on skin or hair which comprises treating the area to be treated with a formulation containing an effective amount of an N-alkylamido morpholinium salts formed by reacting:
   i) a fatty triglyceride, fatty acid, fatty acid chloride, or fatty acid ester;
   ii) an aminoalkylmorpholine; and
   iii) a quaternizing agent.

19. A method of claim 18 where the quaternizing agent can be diethyl sulfate (DES), dimethyl sulfate (DMS), methyl chloride, methyl iodide, methyl bromide, benzyl chloride, allyl chloride, or any of a number of common quaternizing agents.

20. The method of claim 17, wherein the composition comprises an effective amount of Soyamidopropyl Ethylmorpholinium Ethosulfate derived by reacting high oleic soybean oil and aminopropylmorpholine and quaternizing the resulting amide with diethyl sulfate.

21. The method of claim 17, wherein said formulations contains from 0.1-10% by weight of Soyamidopropyl Ethylmorpholinium Ethosulfate.

22. The method of claim 17, wherein said formulation is in the form of a hair lotion, antiperspirant, hydro-alcoholic solution, stick deodorant or dusting powder.

23. A method of claim 18 wherein the fatty portion of the amidoamine-derived deodorant is derived from soybean oil, high oleic soybean oil, olive oil, oleic acid, linoleic acid, ricinoleic acid and other fatty acids and fatty glycerides with unsaturation in their chains.

24. The method of claim 18, wherein the composition comprises an effective amount of Soyamidopropyl Ethylmorpholinium Ethosulfate derived by reacting high oleic soybean oil and aminopropylmorpholine and quaternizing the resulting amide with diethyl sulfate.

25. The method of claim 18, wherein said formulations contains from 0.1-17% by weight of Soyamidopropyl Ethylmorpholinium Ethosulfate.

26. The method of claim 18, wherein said formulation is in the form of a hair lotion, antiperspirant, hydro-alcoholic solution, stick deodorant or dusting powder.

* * * * *